United States Patent [19]

Miller

[11] Patent Number: 4,729,416
[45] Date of Patent: Mar. 8, 1988

[54] STEERING WHEEL COVER

[76] Inventor: Derek J. Miller, 2311 Constitution Dr., San Jose, Calif. 95124

[21] Appl. No.: 863,818

[22] Filed: May 12, 1986

Related U.S. Application Data

[63] Continuation of Ser. No. 648,635, Sep. 7, 1984, abandoned.

[51] Int. Cl.$^4$ .......................... B62D 1/06; B65D 65/08
[52] U.S. Cl. .................................... 150/52 M; 74/558; 150/52 K
[58] Field of Search ............ 150/52 M, 52 K; 74/558, 74/558.5; 428/473, 94.12

[56] References Cited

U.S. PATENT DOCUMENTS

| | | | |
|---|---|---|---|
| 544,688 | 8/1895 | Pulbrook | 8/94.12 X |
| 1,235,549 | 8/1917 | Burroughs | 74/558 |
| 1,876,993 | 9/1932 | Manning | 150/52 M |
| 2,058,740 | 10/1936 | Summers | 150/52 M X |
| 2,491,803 | 12/1949 | De Heras et al. | 74/558 |
| 2,618,987 | 11/1952 | Goldstine | 74/558 |
| 2,700,590 | 1/1955 | Biery et al. | 8/94.12 |
| 4,179,950 | 12/1979 | Valley | 150/52 M X |
| 4,379,708 | 4/1983 | Rego | 8/94.12 |

Primary Examiner—William Price
Assistant Examiner—Sue A. Weaver
Attorney, Agent, or Firm—Flehr, Hohbach, Test, Albritton & Herbert

[57] ABSTRACT

The present invention provides a heat repellent and heat resistant steering wheel cover comprising an annular band comprised of a layer of eel skin and a layer of a soft flexible material, such as leather, with reinforced rolled outer edges and perforations along the circumference of the reinforced edges providing means for interlacing the annular band to a steering wheel rim.

4 Claims, 5 Drawing Figures

STEERING WHEEL COVER

This is a continuation of application Ser. No. 648,635, filed Sept. 7, 1984, now abandoned.

The present invention relates to a heat resistant and heat repellent steering wheel cover with improved strength and elasticity.

Steering wheel covers have been commonly used in the past to provide improved grip and comfort for the driver of a vehicle. Prior art steering wheel covers are generally of two types, those held in place on a steering wheel by elastic or adhesive means, and those held in place by lacing.

The lace-on type of steering wheel cover generally has perforations along each edge of the cover. The cover is then fastened to the steering wheel by interlacing a cord through the perforations along each edge of the cover and pulling the two edges toward each other by applying tension to the cord. Tight lacing of the steering wheel cover to the steering wheel is necessary for a snug fit and improved grip. Generally, the prior art lace-on steering wheel cover is an annular band composed of a single layer of leather, or a plastic material, with perforations provided along the edges. A common problem with the prior art lace-on covers is that the cord used to interlace and pull the two edges together tightly places excessive strain and tension on the walls of the perforations and thus has a tendency to tear through the walls of the perforations.

Some prior art lace-on sterring wheel covers have attempted to solve the tearing problem by fastening the cover to the steering wheel utilizing a continuous length of lace wrapped around the outside of the cover in a helical fashion. Although the outside helical wrapping eliminates the need for interlacing between the edges, it interferes with the otherwise smooth gripping surface of the cover material. Further, the wrapping does not provide as snug a fit as lacing through perforations because the edges of the cover have a tendency to slip out of juxtaposition causing the cover to bunch together at the outer perimeter of the steering wheel. Other prior art lace-on cover designs, such as the cover design disclosed in U.S. Pat. No. 4,179,950, have attempted to overcome the tearing problem by mounting a flexible cord within the hem of each edge of the cover between the perforations and the edge of the cover. The placement of the cord is designed to prevent the lace from tearing through the edge of the cover due to stress and tension on the perforation walls during interlacing.

An object of the present invention is to provide a steering wheel cover with improved strength and elasticity at the edges permitting tight interlacing while eliminating the need for a cord to prevent tearing.

Another object of the present invention is to provide a heat resistant and heat repellent steering wheel cover.

In general, the present invention provides a steering wheel cover comprising an annular band comprised of an annular layer of eel skin and an annular layer of a soft flexible material, such as leather, plastic, or a rubber-like material. The outer edges of the two layers are rolled under and joined together to provide a dual layer annular band with reinforced rolled edges. The annular band is perforated around its circumference parallel to each of the reinforced edges providing means for interlacing the reinforced edges together around a steering wheel rim. The annular band has a circumference dimensioned for distension around the outer perimeter of the steering wheel rim and a width dimensioned for wrapping around the rim bringing the reinforced edges into juxtaposition at the inner perimeter of the steering wheel rim.

Figure 1:
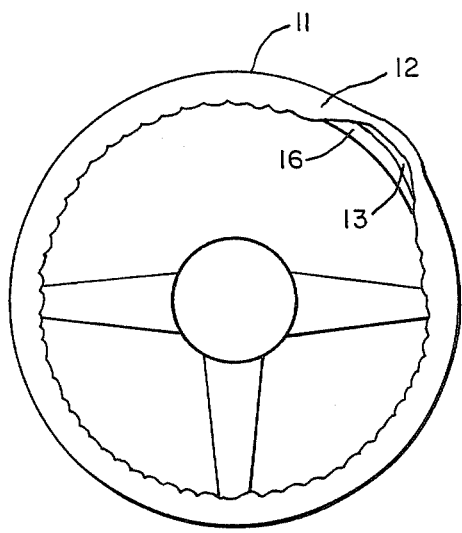
FIG. 1 is a front elevational view of a steering wheel having the steering wheel cover according to the present invention partially in place on the steering wheel rim.
Figure 2:
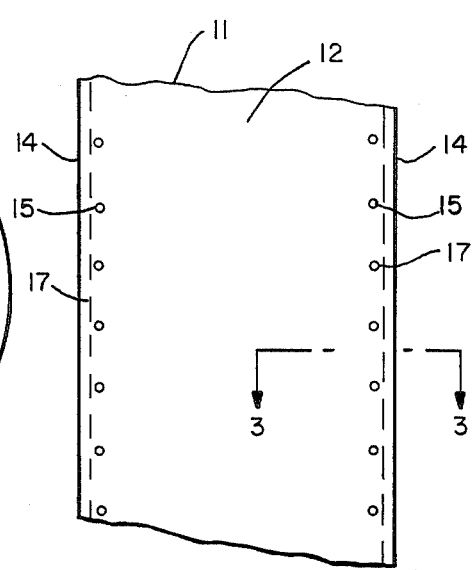
FIG. 2 is a front elevational view of a portion of the steering wheel cover according to the present invention prior to placement on a steering wheel rim.
Figure 3:
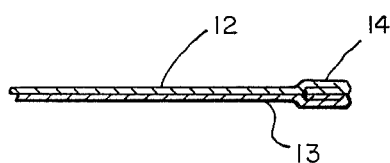
FIG. 3 is a cross-sectional view of a reinforced edge of the steering wheel cover according to the present invention.
Figure 4:
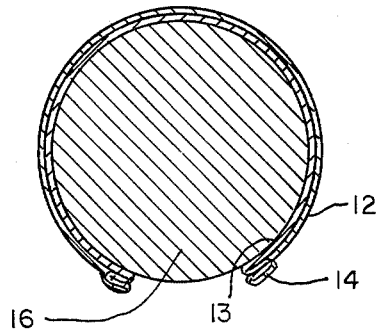
FIG. 4 is a cross-sectional view of the steering wheel cover of the present invention wrapped around a steering wheel rim.

Referring to FIG. 1, the steering wheel cover of the present invention comprises an annular band 11 comprising an annular layer of eel skin 12 and an annular layer of a soft flexible material 13, such as leather, plastic, vinyl or a rubber-like material. Preferably, the soft flexible material is leather. The dual layer annular band is formed by rolling or turning the outer edges of the eel skin layer and the outer edges of the other layer under preferably about ¼ inch and then joining the rolled outer edges of the two layers together to form reinforced edges 14 as shown in FIGS. 3 and 4. The rolled edges can be joined together by adhesive means, or, preferably, by sewing through the rolled edges as shown by the stitch line 17 in FIGS. 2 and 5. Preferably, the eel skin layer overlays the second layer when the cover is positioned on the steering wheel rim.

Figure 5:
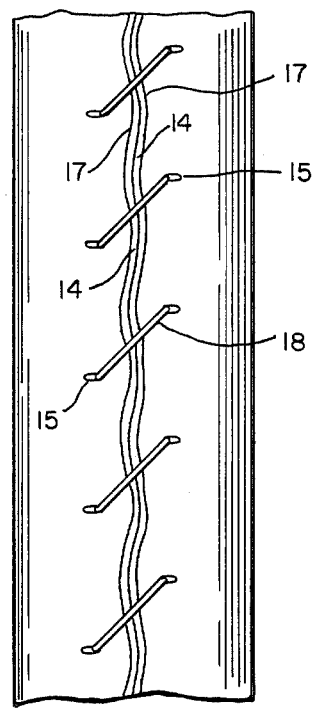
FIG. 5 is an inside elevational view of the steering wheel cover according to the present invention laced onto a steering wheel rim.

The dual layer annular band according to the present invention has a circumference dimensioned for distension around the outer perimeter of the steering wheel rim 16 and a width dimensioned for wrapping around the steering wheel rim such that the reinforced edges 14 are in juxtaposition at the inner perimeter of the steering wheel rim as shown in FIG. 5. The annular band is provided with perforations 15 along its circumference parallel to each of the reinforced edges 14 to provide means for interlacing and fastening the reinforced edges into juxtaposition around the steering wheel rim 16 as shown in FIG. 5. The steering wheel cover is laced onto the steering wheel rim using a cord or lace 18, as shown in FIG. 5. The cord or lace 18, can be encased in plastic at the tip to facilitate guiding of the lace or cord through the perforations during interlacing, or a needle, such as a tapestry needle, can be used to guide the lace or cord through the perforations. The cord or lace 18 is preferably a nylon twine.

To install the steering wheel cover of the present invention, the dual layer annular band 11 is stretched over the outer perimeter of the steering wheel rim 16 as shown in FIG. 1 such that the reinforced edges 14 are juxtaposed along the inner perimeter of the steering wheel rim as shown in FIG. 5. The reinforced edges are then interlaced by drawing a cord or lace through a perforation 15 on one reinforced edge and then through a perforation 15 on the other reinforced edge as shown in FIG. 5. The lace or cord is pulled tight after each pass through opposite perforations. When all perforations have been interlaced and the reinforced edges are pulled together tightly, the loose ends of the cord or lace are knotted together and preferably tucked under the edges of the steering wheel cover.

The cover must be laced tightly onto the steering wheel rim to ensure a snug fit and to prevent slipping, bunching and loosening of the fit with the passage of time. During the lacing of the cover onto the steering wheel rim, the perforations and edges of the steering wheel cover are subjected to a great deal of stress and tension. The inherent strength and elasticity of the eel skin which preferably overlays the second layer, and the reinforced dual layer edges 14, prevent the cord or lace 18 from tearing through the walls of the perforations and edges of the cover during interlacing or after extended use. In a preferred embodiment, the underlayer is a leather, such as lambskin, pigskin or cowhide. The strength and elasticity of a leather underlayer, contributes to the strength of the reinforced edges more so than a plastic, vinyl, or rubber-like underlayer, and thus helps to prevent tearing through the perforations or edges during interlacing or after extended use. Thus, due to the strength and elasticity of the eel skin and the dual layer reinforced edges, the steering wheel cover may be tightly laced onto a steering wheel rim with a high degree of tension without the risk of tearing, ripping or other damage to the edges and perforations of the cover, thereby eliminating the need for mounting a flexible cord in the hems of the cover. Because of the cover's ability to withstand tension and stress at the perforations and edges, a tightly contoured fit and improved grip is easily obtained.

In addition, the steering wheel cover of the present invention has the unexpected advantage of being heat repellent and heat resistant. Unlike ordinary leathers, eel skin when exposed to sunlight and heat does not become unbearably hot to the touch and thus the steering wheel cover of the present invention comprising a layer of eel skin overlaying a second layer of a soft flexible material enables the driver to drive away promptly without the danger and discomfort of a hot steering wheel. In a preferred embodiment of the present invention, eel skin overlays a layer of lambskin. The eel skin repels and distributes direct heat while the lambskin acts as a heat insulator and thereby contributes to the heat resistant quality imparted to the steering wheel cover by the eel skin overlayer. In addition, a fine leather such as lambskin on the underside of the steering wheel cover provides additional padding and comfort to the driver not provided by a vinyl or plastic material. Leathers other than lambskin can also be used, such as calfskin, pigskin or cowhide.

Another advantage of the steering wheel cover of the present invention is that the eel skin overlayer is resistant to water stains and thus will maintain its aesthetic appearance much longer than a steering wheel cover of ordinary leather.

Many modifications and variations of the present invention are readily obvious to those of ordinary skill in the art in light of the above specification and embodiments and it is understood that such modifications and variations are within the scope of the present invention.

What is claimed is:

1. A steering wheel covered comprising:
    a dual layer annular band comprising an annular layer of eel skin and an annular layer of a soft leather selected from lambskin, calfskin, pigskin, and cowhide, wherein said eel skin layer overlays said leather layer when said annaular band is positioned on a steering wheel rim, and wherein said leather layer acts as a heat insulator and said eel skin layer acts as a heat repellent thereby providing a heat resistant steering wheel cover, each of said layers having outer edges rolled under and stitched to the rolled under outer edges of said other layer thereby providing double reinforced rolled edges for said annular band;
    said annular band having perforations along its circumference parallel to each of said reinforced edges providing means for interlacing said reinforced edges into juxtaposition around a steering wheel rim wherein said reinforced edges, the strength and elasticity of said eel skin overlayer, and the strength of said leather underlayer prevent tearing of said perforations resulting from stress and tension on said perforations during interlacing;
    said annular band having a circumference dimensioned for distension around the outer perimeter of said steering wheel rim and a width dimensioned for wrapping around said steering wheel rim juxtaposing said reinforced edges at the inner peimeter of said steering wheel rim.

2. A steering wheel cover according to claim 1, wherein said leather layer is lambskin.

3. A steering wheel cover according to claim 1, wherein said eel skin layer is resistant to water stains.

4. A steering wheel cover according to claim 1, wherein said leather layer provides padding and cushion when the steering wheel cover is positioned on said steering wheel rim.

* * * * *